Oct. 10, 1939. K. MORSBACH ET AL 2,175,538
FILM-HANDLING APPARATUS
Filed May 13, 1939 2 Sheets-Sheet 2

INVENTORS
KURT MORSBACH, DECEASED
BY SIGRID MORSBACH
EXECUTRIX — SOLE HEIRESS
and KURT RASCHKE BY Warren Duncan Foster ATTORNEY Patented Oct. 10, 1939

2,175,538

UNITED STATES PATENT OFFICE 2,175,538

FILM-HANDLING APPARATUS

Kurt Morsbach, deceased, late of Berlin, Germany, by Sigrid Morsbach, sole heiress, Berlin-Halensee, Germany, and Kurt Raschke, Berlin, Germany, assignors to Camera Patents Corporation, Ridgewood, N. J., a corporation of New Jersey Application May 13, 1939, Serial No. 273,528
In Germany August 26, 1930

18 Claims. (Cl. 88—17)

Our invention is particularly designed for amateur users of motion pictures. Our invention is illustrated as applied to a camera, but it can be used for the projection of pictures. For effective use by an amateur the films are preferably contained in separate relatively inexpensive magazines which are loaded at their factories by the suppliers of the films. The user merely opens his camera and drops a magazine into the receptacle therein which receives it. It is desirable that the various parts of the camera be automatically and correctly positioned to receive the magazine when the amateur user opens the door and that all operations are automatically safeguarded so that there is no possibility of injuring the film or of failure of operation. Upon the subsequent closing and latching of the cover, the entire apparatus is automatically placed in position so that the user can start operation whenever he wishes. All threading and manipulation of the film are avoided.

This application is a continuation-in-part of our application Serial Number 542,034, filed in the United States Patent Office June 4, 1931, and in the German Patent Office August 26, 1930, and allowed September 2, 1938, and upon May 30, 1939, patented as Number 2,159,998. In our parent application we describe and claim a film containing magazine characterized by guide channels within the magazine and adjacent certain of the outer walls thereof and embodying film tensioning means which compensate for the difference in character of movement of the intermittent feeding member and the continuously rotating delivery and take-up masses. In our said parent application we describe and show intermittent feeding means and continuously driven taking-up means and those portions of the gate structure of the combination of magazine and apparatus which are embodied within the magazine, but we do not claim this combination therein. A chief purpose of this application is to claim this combination. Another purpose of the present application is to describe more fully and claim the entire unitary channel which both guides the entire operative length of the film from the delivery spool to the take-up spool and applies the proper tensioning and compensating effects, this unitary channel embodying members mounted upon the magazine and others mounted upon the camera and being closely associated with the mechanism which moves the film through this combined channel and the mechanism which jointly controls both the moving mechanism and the movement of the movable portion of this unitary channel.

Another purpose is to provide mechanism which automatically places the channel-forming elements carried by the magazine into proper relation with those carried by the apparatus, particularly by means of mechanism made automatically effective as the cover of the apparatus is closed and locked. Another important object is to control the movement of the guides carried by the camera and magazine respectively into and out of channel-forming relation to each other in automatically interlocked relation to the operation of the feeding member. In apparatus constructed according to this specification, for example, it is impossible to start the feeding of the film until the channel through which the film is fed is completed, a portion of this channel being formed by the apparatus and the rest thereof by the magazine.

A chief purpose of the present invention is to provide for the entire operative length of the film such a substantially continuous guiding and compensating channel parts of which are formed by elements within the magazine and other parts of which are formed by elements carried by the camera, but preferably with those parts which determine the focal plane carried by the camera. Such parts must be made with great accuracy and must not be subject to distortion. Since under commercial practice magazines must be made relatively cheaply in large quantities and for easy transportation, great accuracy is not practicable and they must be light and are subject to distortion. The relatively fewer larger and more expensive cameras, however, can be and are made with great accuracy and stability. As shown herein the gate members which determine the focal plane are formed upon the camera and are moved into operative channel-forming position by the same automatic mechanism which finally positions the magazine in its receptacle and frees the feed and shutter for normal operation.

Another and important object of the present invention is to provide an improved form of film holder together with the various film guiding film tensioning and film controlling elements which are necessary or desirable therewith. Another and a related object is to provide film handling mechanism particularly adapted for cooperation with such a film holder.

While the present invention is described as applied to the combination of a removable film magazine and a film handling apparatus it must be understood that it is not in any way limited thereto. Under many conditions the structure which we herein describe and claim may be advantageously mounted permanently upon a single apparatus. Many of the advantages of the provision of a single unitary guiding, tensioning and compensating channel leading from the supply to the take-up coil past the aperture and the intermittent pull-down and comprising certain parts which are fixed, other parts which are resiliently movable and still other parts which are movable to one position for threading and another for operation together with a unified control for all of the above parts which are operable apply equally well when all of these parts are mounted permanently upon the apparatus.

For convenience we have described our invention as applied to a camera but it is to be understood that under certain conditions it may be applied to any apparatus in which a film is projected or exposed.

Other objects, advantages and characteristics will be evident from the following portion of this specification, the accompanying drawings and the subjoined claims. Although we are showing one preferred form only of our invention for purposes of illustration it will be understood that changes can readily be made without departing from the scope of our broader claims or the spirit of our invention.

In the drawings:

Figure 4a is a fragmentary view showing the shutter of Figure 2;

Figures 1, 1A, 2, 3, 4, 5:
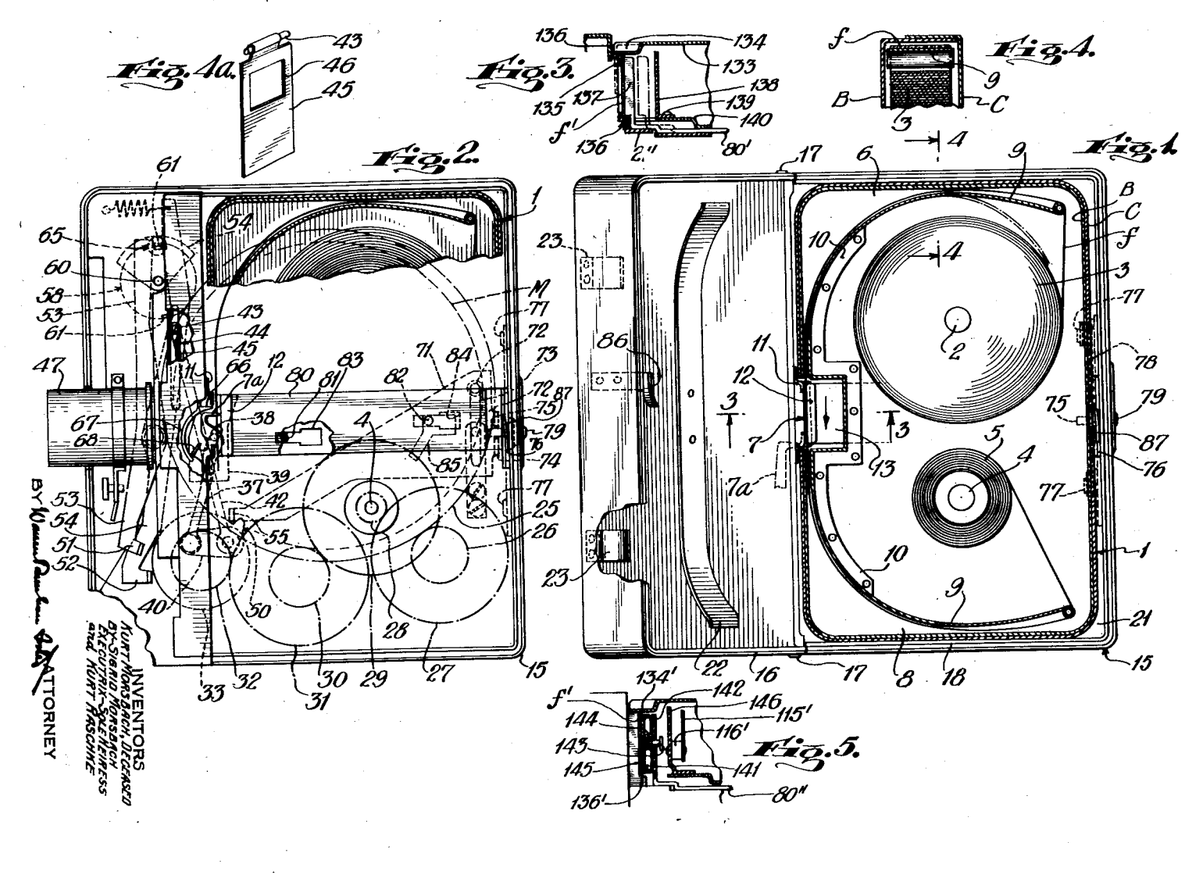
Figure 1 is a top plan view of our magazine partly in section in assembled relation with a camera.
Figure 2 is a top plan view corresponding to Figure 1 partly in section and partly broken away showing the control and driving mechanism for the camera with a magazine positioned therewithin, the gate of the camera being shown in open position.
Figure 3 is a section taken on the line 3—3 of Figure 1.
Figure 4 is a fragmentary section of the magazine taken on the line 4—4 of Figure 1 looking in the direction of the arrows.
Figure 5 is a fragmentary sectional view showing a movable gate member which may be employed in any form of the invention.

A satisfactory and very simple example of a construction embodying our invention is best illustrated by Figure 1.

The film holder shown comprises a casing 1 of substantially rectangular shape. At 2 we have indicated a shaft with which the winding-off film spool or feed or delivery roll 3 is detachably connected in any well-known or approved manner, as for example shown in Figure 6, said shaft being journalled or otherwise mounted in the casing 1 which comprises an inner quadrilateral box-like structure B and an outer cover C therefor which preferably extends well over the inner structure to exclude light, as for example fully shown in Figure 7. A second shaft 4, operatively connected as hereinafter described with a usual spring motor M of the apparatus and driven by such motor, extends into the interior of the holder through an opening in the holder bottom. This second shaft 4 serves to drive the winding-on spool or take-up spool or roll or coil 5. The film f passes from the spool or coil 3 through a guide channel 6 to the film gate or window 7, where the exposure is made and where the film is engaged by a usual feeding claw or pull-down 7a or equivalent means for intermittently advancing it, and through another guide channel 8, toward the winding-on or take-up spool or roll or coil 5. The two channels 6 and 8 are formed between a wall of the inner portion of the holder on one side, and on the other side by curved plate springs 9 (which may be made of one piece of metal), one end of each spring being secured rigidly to the holder bottom, as indicated at 10 to constitute a portion of a fixed guide channel, while the other end of the spring constitutes a continuance of said fixed guide channel and is adjacent to the spool or coil 3 or 5 respectively, the elasticity of the spring tending to make it move outwardly, that is to say, away from the respective film spool or coil. A fixed apertured gate section 11 and a movable section 12 both mounted upon the apparatus, in a manner later to be fully described, constitute a part of the single unitary guide channel which forms a substantially continuous pathway for the film from the delivery to the take-up roll or coil. The movable section 12 fits into the recess generally indicated as 13 formed in the magazine.

When a pull is exerted on the film by the feeding claw or equivalent means, at the window or gate 7, in the direction of the arrow, the result is first to bend or flex the upper or delivery or supply spring 9 as viewed in Figure 1 or 2 inwardly toward the winding-off or supply spool or coil 3, as indicated by chain lines, thereby enabling the film portion between the point of feed and the said coil to be shortened without transmitting all of the pull to the said coil. The upper spring 9 is thus put under tension, and when the pull exerted by the feeding device ceases, the spring by its elasticity resumes the normal position indicated by full lines, and during its outward movement draws a corresponding length of film from the winding-off spool or feed coil 3. Thus, without using any additional part, and while preserving a proper guidance for the film, we avoid any excessive strains on the film at the feed perforations thereof and all jerky action on the film at the gate 7.

The spring 9 adjacent to the channel 8 operates in a manner similar to that described above, but out of step with the other spring 9. In other words, the take-up spring 9, as shown in Figure 1, is flexed inwardly toward the film and therefore placed under tension, during the interval that the film is stationary at the gate, and returns, by its elasticity, to the normal relaxed position, during the feed movement of the film past the gate. During the time that the film is stationary at the gate, the winding-on spool or take-up coil or spool 5, which is driven permanently by the spring motor or equivalent mechanism, exerts a pull on the film and thereby bends the take-up spring inwardly toward the film coil, shortening the film portion between the film gate 7 and the periphery of the film coil on said spool. When thereupon during the next feed movement of the film the length of the film portion between said points is increased, the take-up spring 9 is permitted to swing back outwardly to its original position by its elasticity. It will therefore be understood that like movements of the two springs alternate, the inward or tensioning movement of one spring coinciding in time with the outward or relaxing movement of the other spring. The inward movement of a spring corresponds to the shortening of the film portion engaged by such spring, while the outward movement of a spring corresponds to a lengthening of the respective film portions.

It will be understood by those skilled in the art that the magnitude of the springs 9 is preferably such that they move in step with the operation of the intermittent. The resilience of the springs 9 should bear such relation to the speed and frequency of operation of the intermittent feeding member and the force of the take-up that the entire operative length of film between the two coils is kept continuously in motion. Such an arrangement prevents the formation of slack in the film. Thus the above described resilient portions of the unitary guiding channel completely compensate for the difference in character of movement of the intermittently moving section of the film at the gate and the continuously moving portions thereof forming the delivery and take-up coils, all without the provision of continuously moving sprockets and their associated loops of slack film. It will be understood that this unitary channel is composed of a series of oppositely disposed guides, those adjacent the coils of the film engaging the film in bights and being adapted to accomplish the above noted compensating or tensioning result.

A camera to receive the magazine above described or the one shown in Figures 3 and 4 and later described may consist of a quadrilateral casing 15 provided with a cover 16 hinged at 17 and shown in open position in Figure 1. A double wall 18 is provided to cooperate with the wall 16 to form a light trap when the cover is closed. The receptacle into which the magazine is dropped is formed by these walls and a central plate 21 which forms the floor of the receptacle and, with another similar plate not shown herein, carries much of the operating mechanism. A leaf spring 22 may be attached to the cover 16 to bear upon the top of the magazine. Curved springs 23 provided upon the rear of the cover bear against the back of the magazine when it is in assembled relation with the camera thus pushing it forwardly into operating position. It will be understood that the springs 22 and 23 cooperate with the receptacle in order to position and hold the magazine in the position necessary for proper operation.

The operating mechanism for the camera may include a spring M surrounded by and movable with a pinion 25 which meshes with a gear 26 coaxial and movable with a gear 27 which in turn operates connected coaxial gears 28 and 29. Gear 29 operates gear 30 with which gear 31 is movable. Gear 31 in turn meshes with gear 32 which operates a driving disc 33.

This disc 33 drives a feeding claw or tooth 7a which intermittently feeds forwardly a film, disposed in a magazine, which is assembled with the camera. This claw is mounted on the end of a link 37 guided by a curved slot 38 formed in an intermediate supporting plate 39. At its end opposite the tooth 7a the link 37 is pivotally connected to the free end of a short arm 40 which is pivotally mounted by its other end upon the main driving disc 33. It will be seen that the revolution of the disc 33 in clockwise direction as shown in Figure 2 intermittently feeds the film forwardly.

A reciprocating shutter is driven in timed relation to the intermittent feeding member. A link 42 pivotally mounted upon the main driving disc 33 is guided at its upper end by means of a pin 43 working in a slot 44. Depending from this pin is a long shutter blade 45 with an opening 46, which in timed relation to the movement of the intermittent claw 7a alternately permits light from a lens 47 to reach the film and cuts it off. See Figure 4a. This shutter is so timed that when the feeding mechanism is in the inoperative position as shown in Figure 2 light cannot reach the film.

Figure 8:
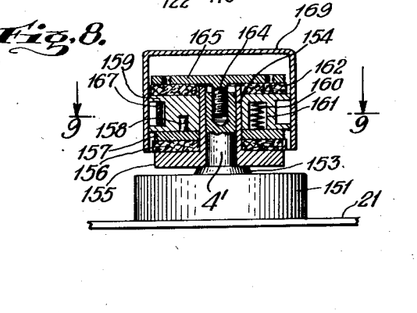
Figure 8 is a view of a frictional take-up driving mechanism.
Figure 9:
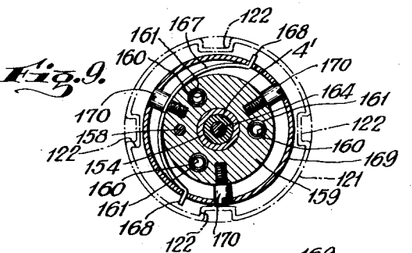
Figure 9 is a sectional view taken upon the line 9—9 of Figure 8 and looking in the direction of the arrows.

The take-up member 4 revoluble with the gears 28 and 29 is likewise driven by the spring M in order to wind up the film upon the take-up mass within the magazine. An approved mechanism for releasably and frictionally coupling the member 4 to the coil within the magazine is shown in Figures 8 and 9 later described but any desired or conventional means may be employed.

To control the operation of the intermittent claw, shutter and take-up the following mechanism may be employed.

Formed in the periphery of the driving disk 33 is projection 50 which is engageable with dogs 51 and 52 respectively turned in the lower ends of control arms 53 and 54 respectively and also with the dog 55 which is a part of the latching mechanism later described. These arms are pivotally mounted upon a stud and held in position by springs. The arm 54 controls the apparatus for the purpose of taking pictures in motion and the arm 53 for the purpose of taking a still picture. As shown in Figure 2 the dog 52 upon the arm 54 is in position to engage the projection 50 upon the release of the latching mechanism. Thereafter the dog 52 may be shifted out of the way by rotation a short distance of two parallel coaxial disks of which only one 58 is shown. Short struts 61 with which the upper portion of the arms 53 and 54 are engageable join these disks so that upon their conjoined movement in a clockwise direction the dog 52 is removed from holding relation with the projection 50 and motion pictures may be taken and upon their contrary revolution in an anti-clockwise direction the dog 52 is removed from holding relation and the dog 51 placed in position ready to stop the movement of the apparatus after one revolution whereby a single or still picture is exposed. It will therefore be understood that rotation of the disks in either direction causes one of the struts 51 to operate the arm 54 but that rotation of the disks in a clockwise direction is without effect upon the still picture arm 53. Rotation of the shaft 60 may be effected by a control button 65 linked thereto in any appropriate manner as for example as shown in Patent Number 1,960,062, dated May 22, 1934, of ourselves and Max Hettler.

To hold the film motionless during exposure, a positioning finger 66 may be provided, although it is not essential. This finger is formed with or mounted upon a spring element 67. The arm 37 which operates the intermittent or pull-down claw 7a is provided with an upwardly struck portion 68 as viewed in Figure 2 which cams the finger 66 out of the film track when the finger 7a is engaged with the film. At other times, however, the resilience of the spring 67 moves the finger 66 into holding relation with a perforation of the film.

Figure 2 for purposes of clarity shows the claw 7a in the position to which it is moved when the operation of the camera is attempted with the cover unlatched. The film can readily be introduced while the claw is in this position but normally after a used magazine has been removed and before the next is inserted the control mechanism has caused the camera to stop with the projection 50 engaging the dog 52 and the finger 7a out of the film channel.

As previously pointed out the complete unitary channel for the film comprises certain elements positioned upon the apparatus and others positioned upon the magazine. One of the channel-forming elements upon the camera, however, must be moved away from its opposite member to permit the film to enter between it and the opposite member as the magazine is dropped into its receptacle and then must be moved toward the opposite member to place and hold the film in the focal plane. These movements are automatically carried out. The unlatching of the cover of the apparatus moves the movable gate section 12 back to open position thereby widening the channel at that point so that the film may readily slip therein as the magazine is dropped into place. During this operation the film moving mechanism is automatically maintained inoperable. When however the cover is closed and latched the movable gate section 12 automatically moves forwardly and presses the film into operative relation with the apertured member 11. This operation also releases the moving mechanism so that the operator can start to take motion pictures or take a still picture at will. The mechanism by which these results are automatically accomplished is as follows:

As shown in Figure 2 the main driving disk 33 is held immovable by engagement of the projection 50 by the dog 55 which is turned in the leftward or lower end of a control plate 71 as viewed in Figure 2. It will be seen that the movement of this control plate upwardly as viewed in Figure 2 will permit the film feeding mechanism to operate and that its movement therefrom to the position in which it is shown in Figure 2 will block it. The plate is guided by pins 72 operating in a slot 73. Right-angled projections 74 struck in plate 71 coact with a pin 75 mounted upon a slide 76 guided by pins 77 projecting inwardly from the right-hand wall of the camera as viewed in Figure 2 and controlled by a wire spring 78. A button 79 extending to a point exterior of the camera for easy operation by a finger of the user operates the slide.

The movable gate plate or member 12 is resiliently mounted upon an upwardly struck projection in the gate carrier bracket 80. This mounting may be as shown in Figure 5 which is described hereinafter or it may be in any desired or conventional fashion. This carrier bracket may be guided by pins 81 and 82 working in slots 83 and 84 respectively. The pin 82 projects downwardly from this carrier bracket and engages in an angular slot 85 cut in the control plate 71. Thus a movement of the latch upwardly from the position shown in Figure 2 will force the carrier bracket forwardly as viewed in that figure so that the movable plate 12 is brought against the fixed apertured plate 11 and the dog 55 removed from the projection 50 permitting the operation of the feeding mechanism. Thus the gate is closed and the operation of the camera permitted. If after the previous opening of the camera no attempt has been made to operate the mechanism the projection 50 will remain abutting against the dog 52. If however an attempt has been made through the movement of the control button 65 to operate the camera the projection 50 will have moved forwardly to the position shown in Figure 2. As elsewhere stated the magazine may be placed in the camera with the parts as shown in Figure 2 and operation recommenced at will.

A cam faced latching member 86 is provided upon the cover member 16 and engages with a corresponding cam faced member 87 mounted upon the slide 76 which is operated by the latch button 79. Thus when the cover is closed it is latched in position by the same movement of the button 79 which releases the driving mechanism and moves the movable gate member to closed position thus bringing the film into the focal plane. On the contrary when the latch is released the bracket and gate member carried thereby are moved backwardly, the channel at that point is widened and the mechanism for feeding the film through the channel is rendered inoperative.

Figure 6:
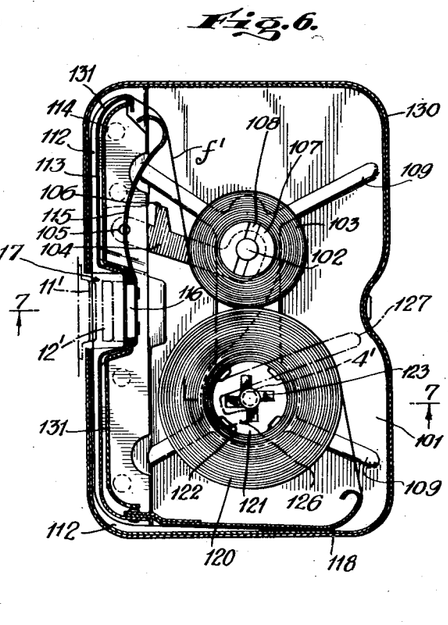
Figure 6 is a top plan view of an improved form of magazine which may be used in place of the one shown in Figures 1 and 2, the gate of the camera being shown in open position.
Figure 7:
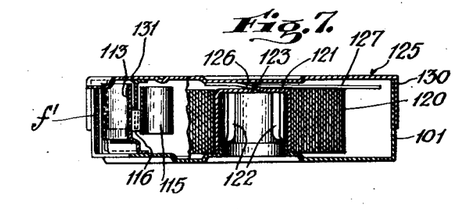
Figure 7 is a section taken on the irregular line 7—7 of Figure 6 looking in the direction of the arrows.

The improved form of film holder or magazine shown in Figures 6 and 7 may be employed with the mechanism shown in Figures 1 and 2. Figure 6 is shown with the gate sections 11' and 12' of the camera separated before the latching of the cover has moved the movable member 12' against the film.

This magazine comprises a case 101 of substantially rectangular shape. The shaft 102 for the winding-off or delivery or supply roll or coil 103 is fixed to a light irregularly shaped plate 104 which is pivoted upon a pin 105 and formed with a projecting stop 106. Journalled upon the spindle 102 is a hub 107 into the top of which is cut a slot 108 for cooperation with a locking mechanism, not shown, to prevent the unwanted unrolling of the film before the magazine is placed within the camera. Struck upwardly in the casing are ribs 109 which both strengthen the case and serve as edge guides for the film. The forward portion of the film channel 112 is shown as bounded inwardly by a single piece 113 which embodies a portion struck at right angles to the film guiding portion and attached as by rivets 114 to the bottom of the case. A delivery tensioning arm 115 consisting of a flat leaf spring is attached to a block 116 which is fastened to the channel forming member 113 back of a recess 117 formed to receive a movable gate member 12' shown in dot-and-dash lines which corresponds to the gate member 12 as described in connection with Figures 1 and 2. Oppositely disposed when the magazine is placed upon the apparatus is a fixed apertured gate member 11' likewise shown in dot-and-dash line. The trailing or take-up end of the channel 112 is formed by a long leaf spring 118 attached to the guide plate 113.

A take-up roll or coil 120 is attached to and wound upon a hollow cylindrical thimble or hub 121 which is operated through a slip connection later described by a take-up shaft 4' corresponding to the shaft 4 previously described. The inwardly struck depressions 122 coact with motion-transmitting projecting ears 168 later described which are formed in the exterior of a friction drive operated by the shaft 4'. To keep the take-up mass from unwinding a ratchet is employed which includes projections 123 struck upwardly in the top of the hub 121, one side of these projections being inclined and the other presenting a sharp face. Attached to a top cover 125 of the magazine is a single leaf spring consisting of a short arm 126 for cooperation with the upstanding surfaces of the ratchets 123 and a long arm 127 which bears on the edge of the outer periphery only of the take-up coil as it is wound up. The short arm keeps the take-up mass from unwinding and the long arm causes easy and smooth winding and maintains the top surface of the film in a plane.

As the magazine of Figure 6 is first placed in the camera the delivery roll 103 is uppermost and of course at that time is full. Owing to its pivoted support gravity forces this roll to rest lightly upon the outer convolution of the film coil upon the take-up hub. When the operation of the camera is started the take-up hub is of course revolved by power and contact between the outer surface of the take-up coil or hub and that of the delivery coil causes the delivery coil to begin rotation. In other words during the critical period when there is a relatively large mass of film to be pulled directly by the intermittent movement from the delivery coil assistance is given to the rotation of this mass by the driven take-up hub.

Depending from the top or flat side of the cover member 125 are exterior flanges 130 which tend to seal the case against the admission of light. Likewise depending from the top of the cover is a single irregularly shaped plate 131 which when the cover is placed upon the bottom portion of the magazine is disposed therewithin and cooperates with the inner channel-forming members to form an additional light trap or shield. At its central portion this plate 131 is cut away to receive the block 116. It will thus be realized that the foregoing construction forms an unusually efficient light trap for a film magazine.

As has been common almost since the beginning of this art the various surfaces over which the picture-bearing portion of the emulsion side of the film is moved may be relieved so that they will not be scratched.

The tensioning and compensating operation of this form of magazine is the same as that previously described. When this magazine is assembled with a camera as previously described the parts of the two mechanisms form a continuous channel for practically speaking the entire operative length of the film and certain members of the channel as the film is fed therealong supply the tensioning or compensating effect which is necessary for the proper operation of a magazine camera.

It is of course necessary that during the exposure or projection of a film it be maintained without side sway at the aperture, that is to say without displacement in a direction normal to its longitudinal axis. The mechanism shown in Figure 3 may be employed to accomplish this result. The cover 133 of the magazine may be formed with a depression as at 134 over the recess such as that shown at 13 or 117. The inner surface of this depression 134 bears directly upon the top edge of the film f as it passes by the fixed apertured gate section 135. Oppositely disposed to the guiding depression 134 is a ledge 136 projecting upwardly from the plate 21' of the camera below the aperture. A gate or presser member 137 mounted as upon a bracket 80' may be moved from the position shown in chain lines in Figure 3 to the one shown in solid lines in the manner described in connection with the movable gate sections 12 or 12'. When this presser member is disposed relatively closely to the fixed apertured member it will be understood that the film is confined in the front by the gate member 135, at the back by the gate member 137, at the top by the depression 134 in the magazine and at the bottom by the ledge 136. The plate 138 which is riveted as at 139 to the bottom 140 of the magazine forms the back wall of the recess and has members extending in each direction corresponding to the members 9 of Figure 1, or this channel may be formed of a plurality of parts.

It is to be understood that when the latch 79 is in the open position the apparatus is in all respects ready for the reception of a magazine of our type including the characteristics recited above. When the magazine is placed in its receptacle and the cover closed and latched the one act of latching automatically forces the magazine into its proper position, properly positions the film in all planes by the closing of the gate and the co-action of the guides 134 and 136 and releases the feeding mechanism for operation at will.

As previously stated the movable gate plates 12, 12' and 138 may be mounted upon the bracket 80 or one corresponding thereto in any desired way preferably resiliently. Figure 5 shows such a mounting. A movable gate plate 141 is mounted upon an upstruck portion 142 of a bracket 80" by a headed pin 143. A spring 144 coiled about this pin gives the gate section the desired resilience and forces a film not shown against a fixed gate section 145. A guiding depression 134' in the top cover of the magazine cooperates with a ledge 136' disposed upon the camera to position the film against side sway as previously described in connection with Figure 3. The recess in the magazine into which the movable gate member projects when the magazine is assembled in the camera is bounded rearwardly by a plate 146 corresponding to plate 138 or plates 9 or 113. Mounted to the rear thereof by a block 116' is a tensioning member 115', this structure corresponding to the similar structure of Figure 6, the parts shown herein carrying the same reference numerals with the addition of a prime character.

As previously stated the frictional driving or clutch mechanism shown in Figures 8 and 9 may be employed.

Formed upon the supporting plate 21 is a large boss 151 through which projects a shaft 4' which as previously noted is revolved as by the pinion 28 or in any other desired way. A supporting member comprising an upwardly disposed tubular portion 154 and a shoulder portion 155 is freely revoluble upon the shaft 4'. Mounted upon this shoulder is a felt washer 156 above which as viewed in Figure 8 is loosely positioned a disk 157 having fixed therein an upstanding pin 158. This pin engages an appropriate opening in the driven member 159 which is formed with top and bottom shoulders. Three springs 160 are disposed in openings 161 formed in this shouldered member 159 and bear against the disk 157. Positioned above the shouldered member is another felt washer 162. The top portion of the shaft 4' is threaded to receive a screw 164 which projects downwardly from the cylindrical driving plate 165. A curved leaf spring 167 is mounted between the shoulders of the driven member 159 and attached thereto. This leaf spring terminates in two ears 168 which when the magazine is assembled with the apparatus engage the inwardly struck driving lugs 122 previously described. An inverted thimble or cup 169 encloses all of the above described structure down to a position slightly above the protuberance 151 and as by screws 170 is attached to the driven member 159. The ears 168 of the driving spring 167 protrude through appropriate openings in the cup.

It will thus be seen that the disk 165 revolves directly with the shaft 4'. This motion is communicated through the felt washer 162 to the shoudered driven member 159 which in turn drives the take-up coil. The shouldered member is held firmly against the felt washer 162 by the springs 160 previously described. It will thus be seen that slippage is provided between the driving shaft 4' and the driven take-up spool. It will of course be understood that any other satisfactory means of frictionally driving the take-up spool may be employed but the above construction has been found particularly effective.

The advantages of our invention will be evident from the foregoing specification, the subjoined claims and the attached drawings.

We claim:

1. In the combination of a film handling apparatus and a film magazine therefor, the latter having an opening therein at which a film is exposed, a support for a supply coil of the film mounted in the magazine for rotation therein, means mounted in the film handling apparatus for moving the film from the supply coil past the opening in the magazine with an intermittent movement, a support for a take-up coil of the film mounted in the magazine for rotation therein, means in the film handling apparatus for continuously driving said support for said take-up coil, a guide in the magazine adjacent the exposure opening thereof for directing the film past said exposure opening as the film passes from the supply coil toward the take-up coil, and a guiding channel disposed in said magazine between said guide and said take-up coil, said guiding channel having a portion relatively adjacent said guide and engaging that section of the film which is intermittently moved by said intermittent means of said film handling apparatus, said guiding channel cooperating with said guide to direct the film toward said take-up coil and also including film tensioning means disposed further along in the path of said film as it travels to the take-up coil and engaging the film and actuated by movement given it by the film under the influence of said intermittent moving means and said continuous driving means of said apparatus for compensating for the difference between the intermittent movement of the film within said magazine as it leaves said exposure opening and the continuous movement of the film as it is drawn to and coiled about said take-up support.

2. In the combination of a film handling apparatus and a film magazine therefor, the latter having an opening therein at which the film is exposed, a support for a supply coil of the film mounted in the magazine for rotation therein, means mounted in the film handling apparatus for moving the film past the opening in the magazine with an intermittent movement, a support for a take-up coil of the film mounted in the magazine for rotation therein, means in the film handling apparatus for continuously driving said support for said take-up coil, a guide in the magazine adjacent the exposure opening for directing the film past said exposure opening as the film passes from the supply coil toward the take-up coil, and a guiding channel disposed between said guide and said take-up coil, said guiding channel having the outer wall thereof formed by a wall of the magazine and the inner wall thereof formed by a leaf spring, the end of said leaf spring relatively adjacent said guide being mounted substantially rigidly in the magazine, the other end of said leaf spring being disposed relatively adjacent the take-up coil and being of predetermined resiliency such that the continuous movement of the film as the apparatus coils it up upon the take-up support causes said spring to flex out of its normal position when the intermittent means of the apparatus maintains the film at periods of rest, and movement of the film by the intermittent means which results in urging the film into said channel causing said leaf spring to return to its normal unflexed position, thereby maintaining that section of the film between the rigid end of said spring and said take-up coil in continuous motion during the operation of the film handling apparatus.

3. In the combination of a film handling apparatus and a film magazine therefor, a support for a supply coil of film mounted in the magazine, means for drawing the film from said supply coil past an exposure opening in the magazine with an intermittent movement, a support for a take-up coil of film mounted in the magazine, means for driving the take-up support in a continuous manner, a guide for directing the film past said exposure opening as the film passes from the supply coil toward the take-up coil, and a guide channel disposed between said guide and said take-up coil and cooperating with said guide to direct the film toward said take-up coil and including means engaging the film and compensating for the differences in character of movement of the film as it is drawn from the supply coil and past said exposure opening and the movement of the film as it is drawn toward the take-up coil.

4. In the combination of a film handling apparatus and a film magazine therefor, a support for a supply coil of film mounted in the magazine, means for drawing the film from said supply coil past an exposure opening in the magazine with an intermittent movement, a support for a take-up coil of film mounted in the magazine, means for driving the take-up support in a continuous manner, a guide for directing the film past said exposure opening as the film passes from the supply coil toward the take-up coil, and a guide channel disposed between the guide and the take-up coil and into which channel the film is advanced intermittently, said guide channel embodying means for preventing the take-up coil from drawing the film faster than the film is advanced into said guiding channel.

5. In the combination of a film handling apparatus and a film magazine therefor, a support for a supply coil of film in the magazine, feeding means upon the apparatus for drawing the film from said supply coil past an exposure opening in the magazine with an intermittent movement, a support for a take-up coil in the magazine, means upon the apparatus for driving the take-up support in a continuous manner, a guide disposed upon a mounting within the magazine rigid therewith for directing the film past said exposure opening as the film passes from the supply coil to the take-up coil, and means disposed between the guide and the tape-up coil for preventing the pull exerted on the film by the take-up support from affecting the film at the exposure opening while the intermittent feeding means is inoperative.

6. In combination, a film handling apparatus having means adapted to engage a film for feeding it intermittently from a source of supply past an exposure opening in a magazine and for taking the film up continuously after it has been so fed, and a film magazine having means for supporting said supply of film and said taken-up film, a guide for directing the film as it is intermittently fed past the exposure opening in said magazine from the supply toward said taken-up film, and a resilient member between said guide and the taken-up film and cooperating with said guide to direct the film toward said taken-up film and bearing against the film for compensating for the differences in character of movement of said intermittent feeding means of said apparatus and said continuously driven taken-up film of said magazine to maintain the film uniformly under tension.

7. In a film handling apparatus, the combination of a first and second gate plate, said gate plates being disposed oppositely to each other and one being apertured, a support for a take-up coil of film, means for advancing the film between said gate plates and toward said take-up coil, means for coiling the film upon said take-up support, a first plate extending from the adjacent end of said first gate plate to a point near the take-up coil, a second plate lying adjacent and opposite thereto and extending from the adjacent end of the second of said gate plates toward the take-up coil and cooperating to form a passage along which the film passes, the end of the latter plate adjacent the take-up coil being of a predetermined flexibility, the film passing over the flexible end and being automatically maintained in a state of uniform tension as it is coiled on the take-up support.

8. In a motion picture apparatus having means for compensating for the difference in character of movement of continuously revolving winding-off and winding-on coils and an intermittently moving section of the film therebetween, the combination of an apertured guide, a lens cooperating with said apertured guide, a presser guide disposed oppositely to said apertured guide for holding the film thereagainst and in the plane of said lens, a fixed guiding structure extending from said apertured guide and to a position relatively adjacent the winding-on coil and forming one side wall of a channel through which the film is fed, and resilient guiding means disposed opposite to said structure and forming the other side wall of said channel, said resilient means including a portion which is fixed at one end adjacent said presser guide and relatively free at the other and opposite end adjacent said winding-on coil and so disposed that the film in passing over the end thereof is engaged in a bight, a pull-down member for intermittently advancing the film through said channel from said apertured guide toward said winding-on coil, and means for yieldingly and continuously driving said winding-on coil, the resilience of said resilient means compensating for the difference in character of movement of the portion of the film which is intermittently advanced by said pull-down and continuously coiled by said winding-on coil.

9. In a motion picture apparatus, the combination of an apertured gate plate disposed between winding-off and winding-on coils of film, a lens cooperating therewith, a presser gate plate disposed opposite said apertured gate plate, one of said gate plates being movable to bring the film against the other gate plate and into the focal plane of the lens, an enclosed channel which leads from said aperture and focal plane to each of said coils respectively and together with said gate plates forms a substantially continuous pathway for the film between said coils, one side wall of said channels being fixed during the operation of the apparatus and the opposite wall including a portion relatively adjacent each coil which is resilient at the end toward the coil and so disposed that the film in passing over said end thereof is engaged in a bight and fixed at the end thereof which is relatively adjacent said gate plates, a member for intermittently feeding the film through the channels from the winding-off coil toward the winding-on coil, and means for continuously driving said winding-on coil, the resilience of said resilient channel portions serving during the operation of the apparatus alternately to shorten and lengthen the length of film between each of the coils and the aperture.

10. In a motion picture apparatus having means for compensating for the difference in character of movement of continuously revolving winding-off and winding-on coils of a film and an intermittently moving section thereof intermediate the coils, the combination of a plurality of oppositely disposed guides which cooperate to form a substantially continuous channel from the winding-off coil to the winding-on coil, two of said guides being centrally disposed along the longitudinal axis of said channel and opposite each other, one of said central guides being apertured, a lens cooperating with said apertured guide, the other of said centrally disposed guides being adapted to hold the film against said apertured guide and in the plane of said lens, fixed guides extending in each direction away from one of said centrally disposed guides and to a position relatively adjacent the winding-off and winding-on coils respectively, and resilient guides disposed opposite to said fixed guides and forming the opposite wall of said channel, each of said resilient guides being fixed at the end thereof which is relatively adjacent said centrally disposed guide from which it extends and being relatively free at the other and opposite end adjacent the film coil and so disposed that the film in passing over said end thereof is engaged in a bight between said end and the adjacent coil, a member for intermittently feeding the film through the channel formed by said guides from the winding-off coil toward the winding-on coil, and means for continuously driving said winding-on coil, the resilience of said resilient guides bearing such relation to the speed and frequency of operation of the intermittent feeding member and the force of the take-up that the entire operative length of the film between said coils is kept continuously in motion and compensation is afforded for the difference in character of movement of the section of the film which is being moved intermittently and the continuously moving winding-off and winding-on coils.

11. In a motion picture apparatus having means for compensating for the difference in character of movement of continuously revolving winding-off and winding-on coils of a film and an intermittently moving section thereof intermediate the coils, the combination of a plurality of oppositely disposed guides which cooperate to form a substantially continuous channel from the winding-off coil to the winding-on coil, two of said guides being centrally disposed along the longitudinal axis of said channel and opposite each other, one of said central guides being apertured, a lens cooperating with said apertured guide, one of said centrally disposed guides being movable between a first position wherein space is provided between said guides for initially positioning the film therebetween and a second position wherein it holds the film against said other centrally disposed guide and in the plane of said lens, fixed guides extending in each direction away from said centrally disposed guides and to a position relatively adjacent the winding-off and winding-on coils respectively, and resilient guides disposed opposite to said fixed guides and forming the opposite wall of said channel, each of said resilient guides being fixed at the end thereof which is relatively adjacent to the centrally disposed guide from which it extends and being relatively free at the other and opposite end adjacent the film coil and so disposed that the film in passing over said end thereof is engaged in a bight between said end and the adjacent coil, a pull-down for intermittently feeding the film through the channel formed by said guides from the winding-off coil toward the winding-on coil, a control member for moving said centrally disposed movable guide between said first and second positions, a connection between said control member and said pull-down which includes instrumentalities which render said feeding member inoperative when said guide is in said first position and operative when it is in said second position, and means for continuously driving said winding-on coil, the resilience of said resilient guides affording compensation for the difference in the character of movement of the section of the film which is being moved intermittently and the continuously moving winding-off and winding-on coils.

12. In combination, a film handling apparatus and a magazine for use therewith, said apparatus including a lens, an intermittent feeding member, a take-up shaft, and a drive for intermittently moving said feeding member and continuously moving said take-up shaft; said magazine including a support for a delivery coil of film and a support for a take-up coil of film; a plurality of guiding means some positioned upon said apparatus and some positioned upon said magazine, said guiding means being so disposed in relation to each other that when the magazine is mounted within the apparatus they cooperate with each other to form a substantially continuous channel from the delivery coil toward the take-up coil and through the focal plane of said lens and past said feeding member, said guiding means also embodying means for compensating for the difference in character of movement of the intermittent feeding means and the continuously operating take-up coil; and means for mounting said magazine within said apparatus so that said guiding means form said channel, said intermittent member engages the film, and said take-up shaft is placed in driving relation to said take-up support.

13. In the combination of a film handling apparatus and a film magazine therefor, said film handling apparatus including a lens, an intermittent feeding member, a take-up shaft, and a drive for intermittently moving said feeding member and continuously moving said take-up shaft; said magazine including a support for a delivery coil of film and a support for a take-up coil of film and an exposure opening therebetween; a plurality of film contacting and guiding means some positioned upon the apparatus, and some positioned upon the magazine, said film contacting and guiding means including means disposable in cooperative relation with each other for directing the film from the delivery coil past the exposure opening in the magazine and toward the take-up coil and for holding the film in the focal plane of the lens and also including means disposed between the exposure opening and the take-up coil for preventing the pull exerted on the film by the take-up coil from affecting the section of the film at the exposure opening while the intermittent feeding means is inoperative and the take-up support continues to operate; and means for mounting said magazine within said apparatus so that said guiding means are disposed in said cooperative relation, said intermittent feeding member engages the film, and said take-up shaft is placed in driving relation to said take-up support.

14. In combination, a film handling apparatus and a magazine for use therewith, said apparatus including a lens, an intermittent feeding member, a take-up shaft, and a drive for intermittently operating said feeding member and continuously operating said take-up shaft; said magazine including a support for a delivery coil of film and a support for a take-up coil of film; a plurality of guiding means some positioned upon said apparatus and some positioned upon said magazine, said guiding means being so disposed in relation to each other that when the magazine is mounted within the apparatus they cooperate with each other to form a substantially continuous channel from the delivery coil toward the take-up coil and through the focal plane of said lens and past said feeding means, two of the guides of said guiding means, which together determine the focal plane, being mounted upon said apparatus and one being movable between a first position wherein these guides hold the film closely therebetween and in the focal plane and a second position wherein they are disposed relatively distantly from each other so that the film may readily be introduced therebetween, certain of the other of said guiding means embodying means for compensating for the difference in character of movement of the intermittent feeding member and the continuously operating take-up coil, and control mechanism operatively interconnecting said movable guide and said intermittent feeding member and including means which permit the operation of said feeding member when said movable guide is in said first position and prevent such operation when said movable guide is in said second position; and means for mounting said magazine upon said apparatus so that said guiding means form said channel, said intermittent member engages the film, and said take-up spindle is placed in driving relation to said take-up support.

15. In combination, a film handling apparatus and a magazine for use therewith; said apparatus including a lens, an intermittent feeding member and a drive for said intermittent feeding member and the film moving means of the magazine; said magazine including a support for a delivery coil of film, a support for a take-up coil of film and means driven by the apparatus for moving the film toward the take-up coil; a plurality of film contacting members some positioned upon said apparatus and some positioned upon said magazine, said film contacting members being so disposed in relation to each other that when the magazine is mounted within the apparatus they cooperate to guide the film from the delivery coil toward the take-up coil and through the focal plane of said lens and past and in contact with said intermittent feeding member, certain of said film contacting and guiding members also being operative for compensating for the difference in character of movement of the intermittent feeding member and the continuously operating take-up coil while the film is being intermittently fed from one of said coils to the other; means for coupling said drive of said apparatus with the film moving means of the magazine which are driven thereby, and means for mounting said magazine within said apparatus so that said film contacting members so guide the film, said intermittent member engages the film, and said coupling means are operative to move the film within the magazine by the drive of the apparatus.

16. In combination, a camera and a magazine for use therewith, said camera including a lens, an intermittent feeding member, a drive for said intermittent feeding member and the film moving means of the magazine, a receptacle for said magazine, a cover for said receptacle, and a latch for said cover; said magazine including a support for a delivery coil of film, a support for a take-up coil of film, and means for continuously moving the film toward the take-up coil; a plurality of film contacting members some positioned upon said camera and some positioned upon said magazine, said film contacting members being so disposed in relation to each other that when the magazine is mounted within its receptacle they cooperate to guide the film from the delivery coil toward the take-up coil and through the focal plane of said lens and past and in contact with said feeding member, certain of said film contacting and guiding members being operative for compensating for the difference in character of movement of the intermittent feeding member and the continuously operating take-up coil while the film is being intermittently fed from one of said coils to the other; means for coupling said drive of said camera with the film moving means of the magazine which are driven thereby, said receptacle being effective for the mounting of said magazine within said camera so that said film contacting members so guide the film, said intermittent member engages the film and said coupling means are operative to move the film within the magazine by the drive of the apparatus, and a control mechanism interconnecting said latch and said intermittent feeding member and including instrumentalities which prevent the operation of said intermittent feeding member when said latch is in open position and make possible such operation when said latch is closed.

17. In combination, a film handling apparatus and a film magazine therefor, the latter having a recess formed in one wall thereof embodying an opening at which the film is exposed, a support for a supply coil mounted in the magazine for rotation therein, a pull-down claw mounted in the film handling apparatus for moving the film from the supply coil past the opening in the magazine with an intermittent movement, two oppositely disposed gate plates mounted upon said apparatus, means for mounting said magazine upon said apparatus so that at least one of said gate plates is disposed within said recess, means for moving one of said gate plates away from the other thereof to a first position wherein it is disposed distantly thereto ready for the reception of the length of film spaced across the recess of the magazine as the magazine is positioned upon the apparatus and a second position wherein it is placed adjacent said other gate plate to maintain the film in the focal plane of the lens ready for a film feeding operation, control mechanism operatively interconnecting said moving means and said intermittent pull-down and containing instrumentalities which prevent the operation of said claw when said movable gate plate is disposed in said first position and permit such operation when said claw is disposed in said second position, a support for a take-up coil mounted in the magazine for rotation therein and adapted to be continuously driven by means in the film handling apparatus, a first guiding channel disposed in said magazine and extending between said recess and said supply coil, a second guiding channel disposed in said magazine and extending between said recess and said take-up coil, each of said guiding channels having a portion relatively adjacent said gate plates and engaging that section of the film which is intermittently moved by said intermittent pull-down of said film handling apparatus, each of said guiding channels when said magazine is mounted upon said apparatus cooperating with said gate plates to direct the film from said supply coil to said take-up coil and into contact with said intermittent pull-down thereby forming a substantially continuous enclosed passageway between said coils, one side of each of said guiding channels being relatively fixed and the other side of each of said guiding channels being relatively fixed at the end relatively adjacent said gate plates and being relatively movable and resilient at the end adjacent said coil and free to move, each operation of said intermittent pull-down being effective to draw film from said supply coil and at the same time to place said resilient channel-forming member adjacent thereto under tension, the resilience of said member being effective to continue the supply coil in motion during the period of idleness of the pull-down thereby supplying ready for the next operation of the pull-down a portion of the film necessary for such operation and simultaneously keeping the film under tension and the drive of the take-up supply coil in operation, the drive of the take-up support by the apparatus being effective during the period of idleness of the intermittent pull-down to wind film upon the take-up coil against the resilience of the guide adjacent thereto and simultaneously to place said guide under tension, the resilience of said guide being effective during the next period of operation of the pull-down to withdraw from the channel a portion of the film then fed forwardly into the channel by the pull-down while the movement of the take-up support continues thus maintaining the length of film between the intermittent pull-down and the take-up coil continuously in motion and under tension.

18. In combination a camera and a removable magazine for use therewith, said camera including a receptacle having an inner wall for the reception of the magazine, a cover for said receptacle, a latch for said cover, and a plurality of springs mounted on said cover some adapted to press upon the top of the magazine and some upon a side thereof when the cover is closed and the magazine is in said receptacle, a movable gate plate mounted upon said wall, a fixed gate plate disposed oppositely to said movable gate plate and provided with an aperture, a side guide for the film positioned between said fixed gate plate and said wall and projecting toward said movable gate plate for guiding one edge of the film, a lens cooperating with said aperture, an intermittent pull-down for feeding a film between said gate plates, a shaft projecting through said wall normal thereto, a threaded driving disk mounted in the end of said shaft, a shouldered driven disk mounted loosely upon said shaft between said driving disk and said wall, means associated with said shaft for frictionally transmitting the motion of said driving disk to said driven disk, a thimble surrounding said shaft, said disk and said transmission, ears revoluble with said driven disk projecting through said thimble and driving it, and means including a spring motor for continuously driving said shaft and intermittently driving said pull-down, mechanism for controlling the operation of said drive, said control mechanism including interconnections between said latch, said movable gate plate and said drive means which move said movable gate plate away from said fixed plate and render said driving means inoperable upon the opening of said latch and move said movable gate plate to adjacent relation with said fixed gate plate thereby closing the gate and release said driving means upon the closing of said latch; said magazine comprising a substantially quadrilateral enclosure with a centrally disposed recess so positioned that when the magazine is assembled with the camera said movable gate plate is disposed therewithin and having a side guide for the film formed above said recess and disposed opposite to said previously mentioned side guide when magazine and camera are assembled, a supporting arm pivoted within said magazine, a shaft mounted upon said arm, a delivery hub revoluble upon said shaft and adapted to support a delivery coil of a film, a take-up hub mounted in said magazine and including inwardly struck lugs so disposed that they can be driven by said ears when the magazine is assembled with the camera and adapted to support a take-up coil of the film, a guiding channel leading from said recess toward said delivery hub, a spring member engaging the film in a bight as it passes from the delivery hub into said channel, a guiding channel leading from said recess toward said take-up hub, the inner wall of said guiding channel terminating in a leaf spring engaging the film in a bight, said leaf spring and said spring member being effective to compensate for the difference of character of movement of said coils of film disposed upon said hubs as they are continuously revolved and said intermittently fed section therebetween when camera and magazine are in assembled relation, said springs upon said cover cooperating with said receptacle to position the magazine so that said gate plates and side guides and said guiding channels form an enclosed channel for the film between said coils and in contact with said pull-down and the movement of said latch to closed position being effective to lock said cover, close the gate thereby bringing the film into the focal plane of the lens, and free the drive so that the driving means may be operated thereby advancing the film through said channel and through the focal plane and winding it up upon the take-up hub, said pivoted support for said delivery coil permitting its periphery to rest upon the periphery of the take-up coil which is driven by said shaft and its associated parts thereby assisting in advancing the film, while said leaf spring and said spring member compensate for the difference in character of movement of the respective sections of the film which are moved continuously and intermittently.

SIGRID MORSBACH,
*As sole heiress, and under German law de facto personal representative and executrix under the will of the late Kurt Morsbach.*
KURT RASCHKE.